United States Patent [19]

Gargini et al.

[11] Patent Number: 4,538,174
[45] Date of Patent: Aug. 27, 1985

[54] TWO-WAY SUBSCRIBER TV SYSTEM WITH MULTIPLE SUBSCRIBER'S SETS

[75] Inventors: Eric J. Gargini, West Drayton; Henry L. Baker, Northwood, both of England

[73] Assignee: Communications Patents Limited, London, England

[21] Appl. No.: 494,988

[22] Filed: May 16, 1983

[30] Foreign Application Priority Data

Mar. 11, 1982 [GB] United Kingdom ................. 8306725
May 14, 1982 [GB] United Kingdom ................. 8214159

[51] Int. Cl.³ .............................................. H04N 7/10
[52] U.S. Cl. ..................................... 358/86; 358/147; 455/4; 455/5
[58] Field of Search ............... 358/84, 86, 147; 455/2, 455/3, 4, 5, 6; 179/2 TV, 2 TS

[56] References Cited

U.S. PATENT DOCUMENTS

| | | | |
|---|---|---|---|
| 3,859,596 | 1/1975 | Jannery et al. | 455/6 X |
| 3,997,718 | 12/1976 | Ricketts | 358/84 |
| 4,205,343 | 5/1980 | Barrett | 358/147 |
| 4,302,771 | 11/1981 | Gargini | 358/86 |
| 4,390,900 | 6/1983 | Van Kampen et al. | 358/147 |
| 4,395,750 | 7/1983 | Gohm et al. | 455/5 X |
| 4,450,477 | 5/1984 | Lovett | 358/86 |

FOREIGN PATENT DOCUMENTS

WO82/02639 8/1982 PCT Int'l Appl. ................... 358/86
2063026 5/1981 United Kingdom .

OTHER PUBLICATIONS

W. G. Simpson, "Broadband Cable Systems", vol. 3, Part 1, of *British Telecommunications Engineering*, pp. 6-13, Apr. 1984.
W. K. Ritchie, "Multi-Service Cable-Television Distribution Systems", *British Telecommunications Engineering*, vol. 1, Jan. 1983, pp. 205-210.
Mesiya et al, "Mini-Hub Addressable Distribution System for Hi-Rise Application," First Annual Phoenix Conference on Computers and Communications, Phoenix Az.,·U.S.A. (9-12 May 1982), IEEE, pp. 346-351.

Primary Examiner—Keith E. George
Attorney, Agent, or Firm—Laurence R. Brown

[57] ABSTRACT

A communications system comprising at least one exchange, television signal sources located at the exchange, subscriber's units each connected to the exchange by a respective direct communications link and provided with a television signal receiver, and selectors located at the exchange for selectively connecting the television signal sources to the communications links. The subscriber's units have transmitters for applying data signals to their respective communications links for transmission to the exchange to control the selectors and for transmitting general data to the exchange. The subscriber's units may each comprise two subscriber's stations each of which has a respective television receiver and data signal transmitter. Each subscriber's station is associated with a respective exchange-located selector controlled by that subscriber's station transmitter. Signals transmitted to the subscriber's stations are frequency division multiplexed, each subscriber's station receiver being tuned to receive a respective one of the FDM signals. Signals transmitted to the exchange are time division multiplexed under the control of a timing signal transmitted from the exchange, the exchange being responsive to the timing signal to identify the source of data signals received from each subscriber's unit.

19 Claims, 12 Drawing Figures

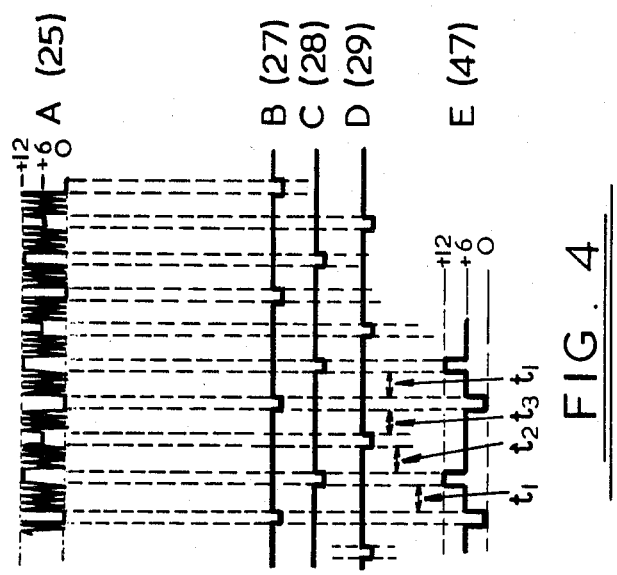

TWO-WAY SUBSCRIBER TV SYSTEM WITH MULTIPLE SUBSCRIBER'S SETS

The present invention relates to a communications system in which subscribers to the system can both receive signals from and return signals to the system via a cable carrying either electrical or optical signals.

BACKGROUND ART

Communications systems of the above type developed from the well known wired broadcasting systems in which television and sound signals are distributed to subscribers. Known wired broadcasting systems have generally followed one of two basic design approaches, that is the braodband approach or the star network approach.

In broadband systems all signals which are to be available to subscribers are broadcast simultaneously on a coaxial cable and signal selection is effected by tuning of the subscribers receiver. Thus the broadcast signals are frequency division multiplexed. This approach has the advantage that the cable network is relatively simple but the disadvantage that the number of different signals which can be transmitted is limited by the available bandwidth. Furthermore there is now a demand not only for an increased number of different signals but also for two way communication, i.e. the capacity for subscribers to transmit data to the system, not merely to receive signals from it. Broadband systems which can provide the subscribers with the facility of transmitting signals and which can identify the subscriber source of transmitted signals are complex, particularly when the number of subscribers is large. Generally some form of time division multiplexing has to be employed to manage the subscriber transmitted signals.

In star network systems each subscriber is connected by his own cable to a signal distribution centre commonly referred to as an exchange. At the exchange are located selectors controlled by the subscribers for connecting the subscriber cables to desired signal sources all operating at the same signal frequency. There is thus no theoretical limit on the number of different signals which can be broadcast to the subscribers even though each subscriber has only one cable extending to his premises. Furthermore the source of data signals transmitted by a subscriber is identified by the cable on which the data signals appear. Thus star networks are inherently more suitable for use in high signal capacity two way systems. The basic cable network is however more complex as each subscriber must be linked directly by his own cable to the exchange. In practice in all but small systems a series of exchanges are provided on a trunk cable network, each exchange serving a localized group of subscribers.

It is now frequently necessary to be able to provide a single subscriber with more than one outlet on his premises, and it is generally thought that a capacity to serve three outlets per subscriber is required when the cable for a new system is to be installed. In a broadband system this does not raise any real problems, providing that the problems inherent in high capacity two way braodband systems can be overcome. In simple star network systems however it would be necessary to provide each subscriber with three cables in case he eventually decided to use three outlets. The expense involved would be prohibitive. It will be appreciated that if subscribers were initially provided with only one cable it would not be economically feasible to subsequently install further cables as subscriber demand required.

Furthermore, in large systems comprising many exchanges the volume of data to be transmitted from the exchanges to the head end is considerable. Although the source of data signals reaching the exchanges from subscriber stations is identified by the cable on which the signals appear it is nevertheless necessary to "label" the source of the signals when the data is transferred to the head end. If this is achieved by associating an address code with each time of data to be transmitted to the head end the data handling capacity of the system is strained further.

It is an object of the present invention to provide a communications system in which the source of subscriber generated signals can be readily determined.

DISCLOSURE OF THE INVENTION

According to the present invention there is provided a communications system comprising at least one exchange, a plurality of television signal sources making signals available at the exchange, a plurality of subscriber units each connected to the exchange by a respective direct communications link and each provided with a television signal receiver. Selectors are located at the exchange for selectively connecting the television signal sources to the communications links, the subscriber units having transmitters for applying data signals to the respective communications link for transmission to the exchange to control the selectors. Each subscriber unit is associated with a respective exchange located selector controlled by that subscriber units' transmitter, the selector associated with said at least one subscriber unit applying television signals to the respective communications link at a frequency to which the subscriber units receiver is tuned. The subscriber unit transmitter being responsive to a timing signal transmitted on the communications link from the exchange to apply data signals to the respective communications link, the exchange comprising means responsive to said timing signal to identify the source of data signals received from the subscriber units.

Preferably, at least one of the subscriber units comprises two subscriber stations each of which has a respective television receiver and data signal transmitter, and each subscriber station is associated with a respective exchange located selector controlled by that subscriber stations transmitter, the selectors associated with the subscriber stations of said at least one subscriber unit playing frequency division multiplexed television signals to the respective communications link, and each subscriber station receiver being tuned to receive a respective one of the television signals applied to the communications link. The subscriber station transmitters apply time division multiplexed data signals to the communications link so that the source of the data signals can be determined.

Thus the present invention retains the inherent advantages of star networks for two-way communication systems and yet provides high capacity without overloading the available bandwidth or dramatically increasing system complexity.

Preferably, the exchange comprises a timing signal transmitter providing an AC timing signal periodically clamped to each of a plurality of DC voltages in a predetermined sequence. Each subscriber station of the subscriber unit comprises a detector for detecting a respective one of the plurality of DC voltages, and data signals are transmitted to the exchange at a predetermined time related to the timing of the detected DC voltage, i.e. immediately thereafter. At the exchange the received data signals and the timing signal are correlated to identify the source of the received data signals. Each subscriber station may be powered by the AC component of the timing signal. If the subscriber unit comprises three subscriber stations the timing signal may be periodically clamped to each of three DC voltages in turn.

Preferably, where a plurality of exchanges are provided each connected to a head end installation by a trunk communications network, each exchange comprises a store in respect of each subscriber station in which data transmitted to the exchange from that subscriber station is stored. Also means are provided for sequentially addressing the stores to read out the stored data onto the communications link in a time division multiplexed data stream, the source of the read out data being identified by its position in the data stream.

The exchanges may be connected in groups to a plurality of data concentrators that are in turn connected to the head end installation, each data concentrator comprising means for storing data received from the head end to indicate which television channels are to be accessible to individual subscriber stations, means for storing data received from the exchanges indicative of television channels selected by individual subscriber stations, means for comparing the stored data, and means for transmitting signals to the exchanges to control the subscriber stations selectors to prevent access to television channels to which access is to be prevented.

The invention also provides a communications system comprising a plurality of subscriber units each connected to a communications network capable of delivery any one of a plurality of different signals on respective television channels, wherein at least one subscriber unit is provided with a teletext receiver. Means are provided for supplying teletext signals on one television channel of the system, and said at least one subscriber unit is allocated exclusive use of one teletext sub-page, the content of the said one sub-page being responsive only to data signals supplied by the said at least one subscriber unit.

In one arrangement, a first television channel is dedicated to full field teletext signals, and a second channel is dedicated to provide interactive services, means being provided such that if the said one subscriber unit transmits data over the system in response to information on the second channel a system response is transmitted on the sub-page of teletext dedicated to that subscriber unit. The subscriber units selector at the exchange are automatically controlled to momentarily connect the teletext receiver to the said first channel such that the data transmitted on the dedicated sub-page is acquired and inlaid on the picture received from the said second channel.

BRIEF DESCRIPTION OF THE DRAWING

Embodiments of the present invention will now be described, by way of example, with reference to the accompanying drawings, in which:

FIG. 4 illustrates time-related waveforms appearing in the equipment of FIGS. 2 and 3;

FIG. 5 illustrates a data signal waveform received at the exchange equipment of FIG. 2;

THE PREFERRED EMBODIMENT

Figure 1:
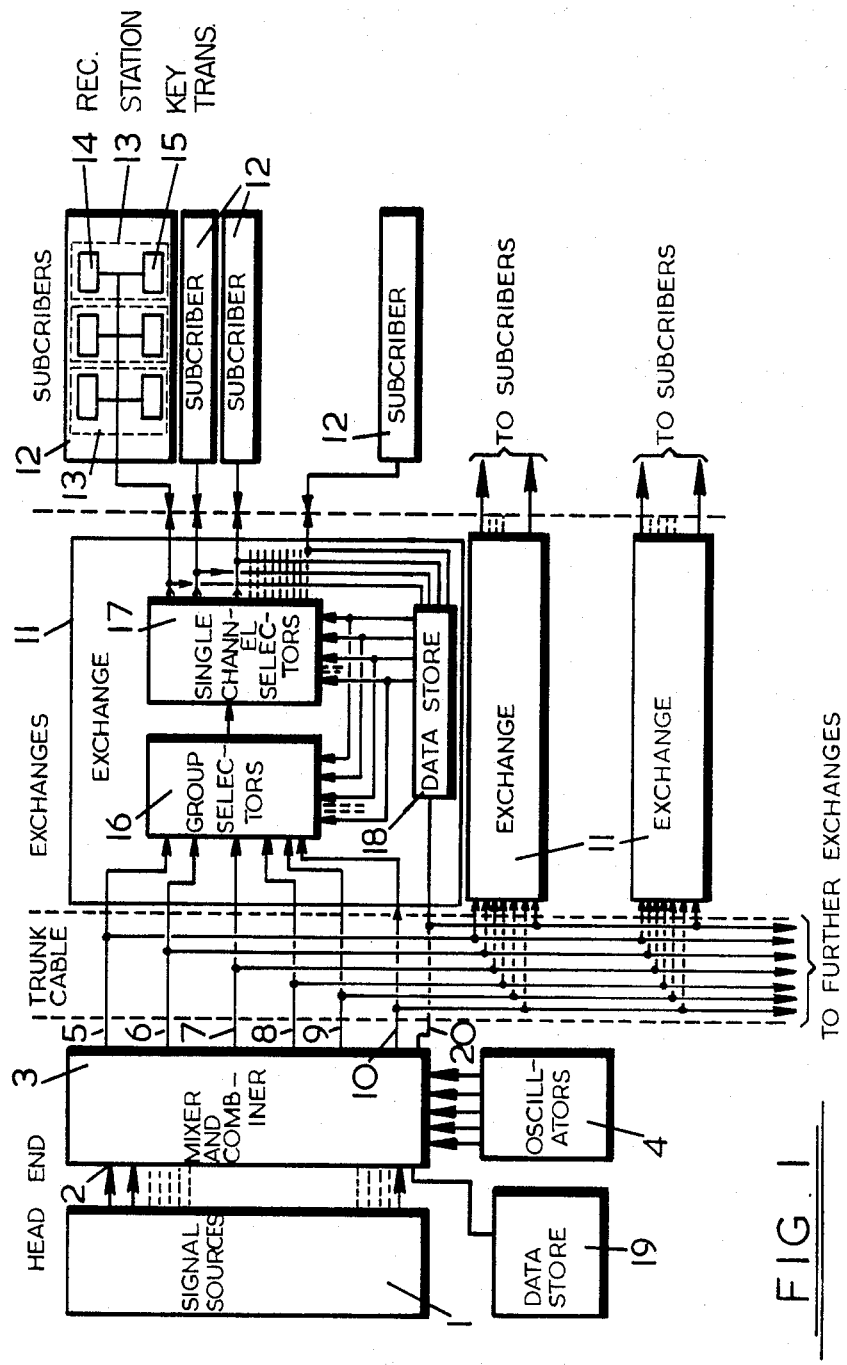
FIG. 1 is a schematic diagram of major portions of a system in accordance with the present invention.

Referring to FIG. 1, the basic lay-out of a thirty-channel television broadcasting system operating in accordance with 525 line NTSC standards is diagrammatically illustrated. The system also enables data to be transmitted from the subscribers to a central station or head-end. All television signals which are to be broadcast over the system are provided by signal sources 1 located at the central station. The television signals may for example be locally generated, derived from recordings, or derived from radiated transmissions. Each television signal is applied via a respective one of thirty cables 2 to a mixer and combiner 3. The signals on the first five channels are mixed with respective ones of five fixed frequency signals provided by local oscillators 4 and the five resultant signals are combined and applied to a coaxial cable 5. The remaining twenty five signals are divided into five groups of five, mixed and combined and applied to coaxial cables 6 to 10 respectively in the same manner as with the first five channels. Thus channels one to five appear on cable 5, channels six to ten on cable 6, channels eleven to fifteen on cable 7, channels sixteen to twenty on cable 8, channels twenty one to twenty five on cable 9, and channels twenty six to thirty on cable 10.

The five program signals carried by each of cables 5 to 10 have frequencies such that no second or third order spurious signals are produced, i.e. the five signals can be allotted to frequency channels having luma frequencies of 69.2, 75.2, 93.2, 123.2 and 135.2 MHz respectively.

The six cables 5 to 100 are connected to a trunk cable which links the head end and each of a series of identical exchanges 11 only one of which will be described in detail. Each exchange 11 supplies signals to a respective group of subscriber units 12. There may be for example several hundred subscriber units 12 connected to each exchange, and each subscriber unit may have up to three subscriber stations 13, each subscriber station comprising a television signal receiver 14 and a key pad 15.

The exchange comprises an array of group selectors 16 each controllable from a respective subscriber station 13 to select the group of channels appearing on any one of cables 5 to 10, and an array of single channel selectors 17 each controllable from a respective subscriber station to select one of the channels from the group of channels selected by the associated group selector 16. The key pad 15 of each subscriber station may be manipulated to transmit data signals to the exchange. The data signals may be used to control the selectors, or for any other purpose, e.g. to order goods or to register a response to a question transmitted to the subscriber.

The oscillators, signal mixing and combining circuits of the head-end operate in a conventional manner familiar to persons skilled in the field of wired broadcasting.

Published British Patent Specification No. 2 063 026 describes a system which is similar in many respects to the system of FIG. 1 although in the system described in detail in Specification No. 2 063 026 each subscriber unit has only one subscriber station. Thus although in the system described in detail in Specification No. 2 063 026 only one television signal is transmitted at any one time to a particular subscriber unit and there is only one possible source of data signals received from a subscriber unit. In the system of FIG. 1 up to three different television signals can be transmitted simultaneously to each subscriber unit and the particular subscriber station sending data signals from a subscriber unit to the exchange must be determined. As a result in FIG. 1 each subscriber station is tuned to a respective one of three television signal frequencies and television signals selected by a subscriber station must be transmitted at the appropriate frequency. Furthermore the data signals transmitted to the exchange are allotted to different time slots depending on their source. The basic television signal selection equipment, that is group selectors 16 and single channel selectors 17, is similar to that described in Specification No. 2 063 026 however and therefore further details of this basic equipment are not given herein.

Each key pad 14 is provided with buttons labelled 0 to 9 and two further buttons labelled "star" and "crosshatch". When a subscriber station is to transmit television signal selection data signals to the exchange, the user presses the star button and then the buttons identifying a channel from which it is desired to receive a television signal. When a subscriber station is to transmit to the exchange data signals not related to television signal selection, the user presses the crosshatch button and then the buttons identifying the data which it is desired to send to the exchange. The data signals are transmitted to the exchange in time slots allotted to each subscriber station as described in detail below and the transmitted signals are stored in a data store 18. All data signals are routed to a central data store 19 at the head end via cable 20 and television selection data signals are routed from the store 18 to the selectors 16, 17.

Figure 2:
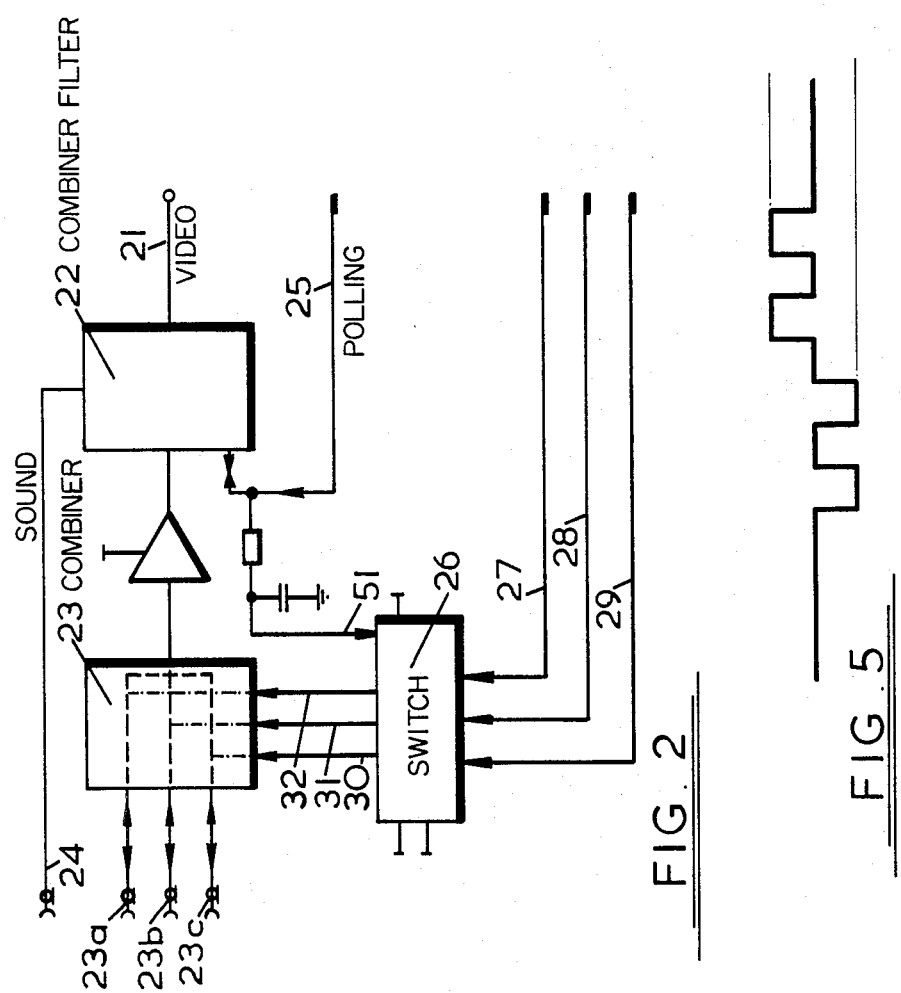
FIGS. 2 and 3 respectively show exchange located and subscriber station located equipment of the embodiment of FIG. 1.

Referring now to FIG. 2, exchange equipment is shown which is provided at the output of the single channel selectors 17 for connecting the three selectors of each subscriber unit to the single coaxial cable extending to the subscriber unit. The single 75 ohm coaxial cable 21 carries signals in both directions to and from a combiner and data filter 22. The combiner and filter 22 receives television signals from a combiner 23 receiving on inputs 23a, 23b and 23c the three outputs of the subscriber units selectors, and also VHF Band II sound signals applied to line 24, and a polling signal applied to line 25. Data and television selection signals returned from the subscriber unit are delivered to a switching network 26 controlled by signals applied to lines 27, 28 and 29, the output of the switching network being applied to the combiner 23 from which it is routed to the data store 18 (FIG. 1) via the inputs 23a, 23b and 23c to the combiner 23 and low pass filters (not shown).

The signals applied to the lines 25, 27, 28 and 29 are illustrated in FIGS. 4A, 4B, 4C and 4D respectively. All of these signals are generated at the exchange or routed to each of the exchanges from the head end. The polling signal of FIG. 4A is an AC signal centered on +6 volts and having a peak-to-peak amplitude of at least 12 volts. At preset intervals of for example a few tens of milliseconds the AC signal is clamped to either zero volts, +12 volts or +6 volts, the clamping voltages running in the sequence 12, 6, 0; 12, 6, 0; etc. On each occasion that the voltage is clamped to zero volts, a negative going pulse appears on line 27 (FIG. 4B); on each occasion that the voltage is clamped to 12 volts a negative going pulse appears on line 28 (FIG. 4C); and on each occasion that the voltage is clamped to 6 volts a negative going pulse appears on line 29 (FIG. 4D). The switching network 26 operates such that data signals received from the combiner and filter 22 are applied to a respective one of outputs 30, 31 and 32, the output 30 being selected for the period $t_1$ between consecutive pulses on lines 27 and 28, the output 31 being selected for the period $t_2$ between consecutive pulses on lines 28 and 29, and the output 32 being selected for the period $t_3$ between consecutive pulses on lines 29 and 27. Thus data signals received during time slots $t_1$, $t_2$ and $t_3$ are switched to respective outputs 30, 31 and 32.

Figure 3:
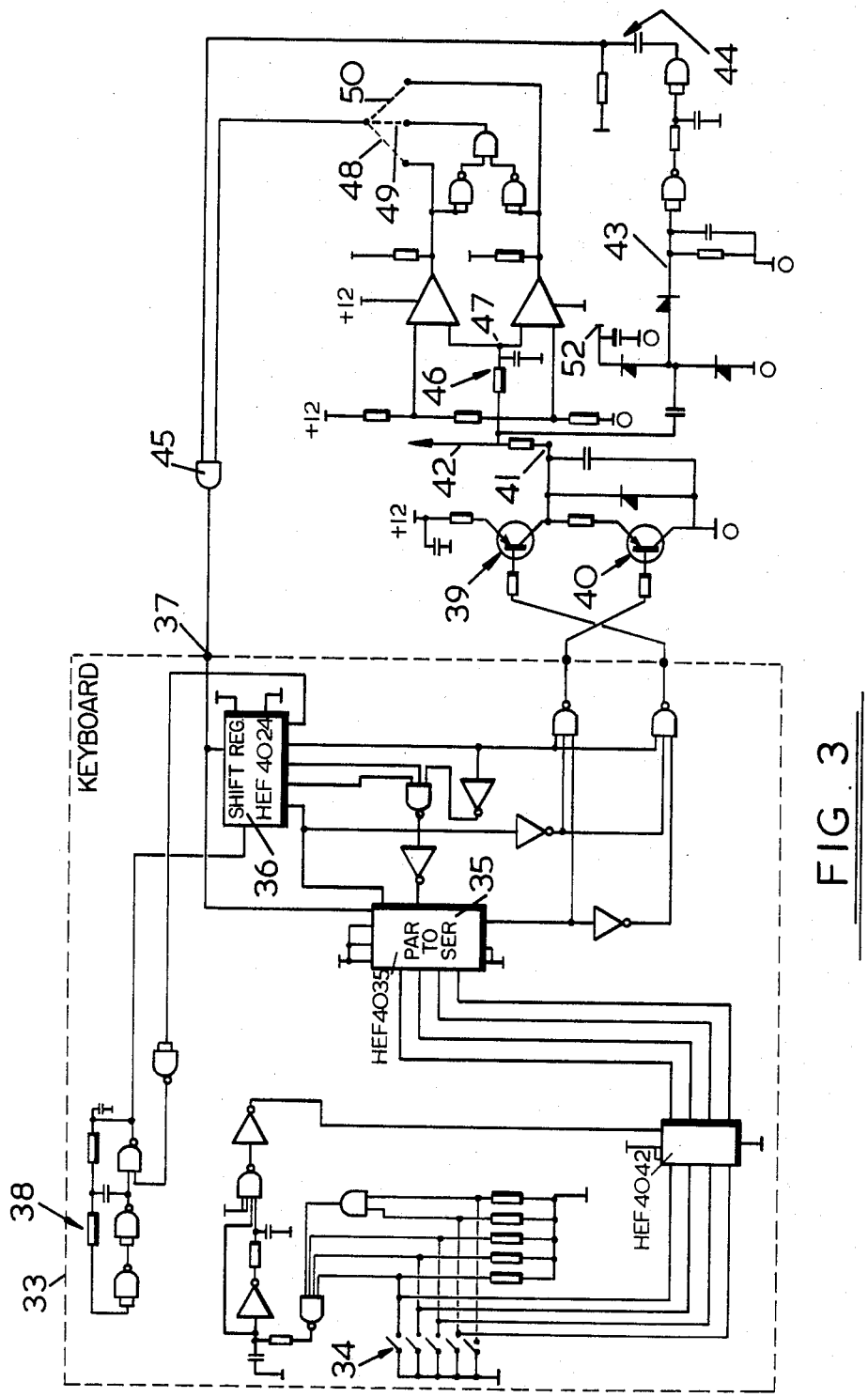

FIG. 3 schematically illustrates equipment provided at each subscriber station, up to three sets of such equipment being provided for each subscriber unit. The equipment surrounded by dotted line 33 is a conventional keyboard arrangement which will not be described in detail as such arrangements are well known. The keyboard has twelve keys, that is 0 to 9, star and crosshatch. Depression of any one key closes one or more of the four switches 34 to form a four bit binary coded decimal signal unique to that key. This signal is introduced via a parallel to serial converter 35 to a shift register 36. After receipt of a reset pulse on input 37 the b.c.d signal is read out serially in response to the output of a clock circuit 38. The b.c.d signal controls output transistors 39 and 40 so that a waveform appears at point 41 which is normally at +6 volts but is clamped to +12 volts (logic "1") or zero volts (logic "0") for the duration of each bit of the b.c.d signal.

The polling signal (FIG. 4A) is received over the single cable connecting the three subscriber stations to the exchange and appears on line 42. On each occasion that the AC component of the polling signal disappears a negative going strobe pulse appears at point 43. The strobe pulse is inverted, delayed, amplified and then passed through a differentiator 44 to deliver a narrow positive going pulse (logic "1") to an AND gate 45. In addition the AC component of the polling signal is filtered out by CR network 46 such that the waveform of FIG. 4E appears at point 47, that is the voltage at point 47 is normally +6 volts but rises to +12 volts and falls to zero volts when the polling signal is clamped to those voltages.

A link is connected in one of three possible positions 48, 49 or 50. When the link is in position 48, 49 and 50 respectively a positive going pulse (logic "1") is applied to gate 45 when the signal of FIG. 4E is at +12 volts, +6 volts and zero volts respectively. A reset signal is generated by gate 45 only when it receives positive pulses on both its inputs. Each of the three keypads of each subscriber unit has the link in a respective one of the three possible positions so that the keypads transmit their b.c.d signals in different time slots in response to the apearance of a reset signal at point 37. At the exchange (FIG. 2) the b.c.d signal superimposed upon the AC waveform is filtered to provide a waveform at point 51 such as that shown for the key number 3 in FIG. 5. The signal is a self clocking return to zero signal and is routed to an appropriate store by the switching network 26 in dependence upon the time slot during which it arrives.

It is obviously necessary to supply power to each keypad and this is achieved by rectifying and filtering the AC component of the polling signal to give a +12 volts source voltage at point 52 (FIG. 3) from which point the rest of the keypad is energized by appropriate connections (not shown). Thus the signalling system is not dependant upon the subscriber unit being locally supplied with power.

Figure 6:
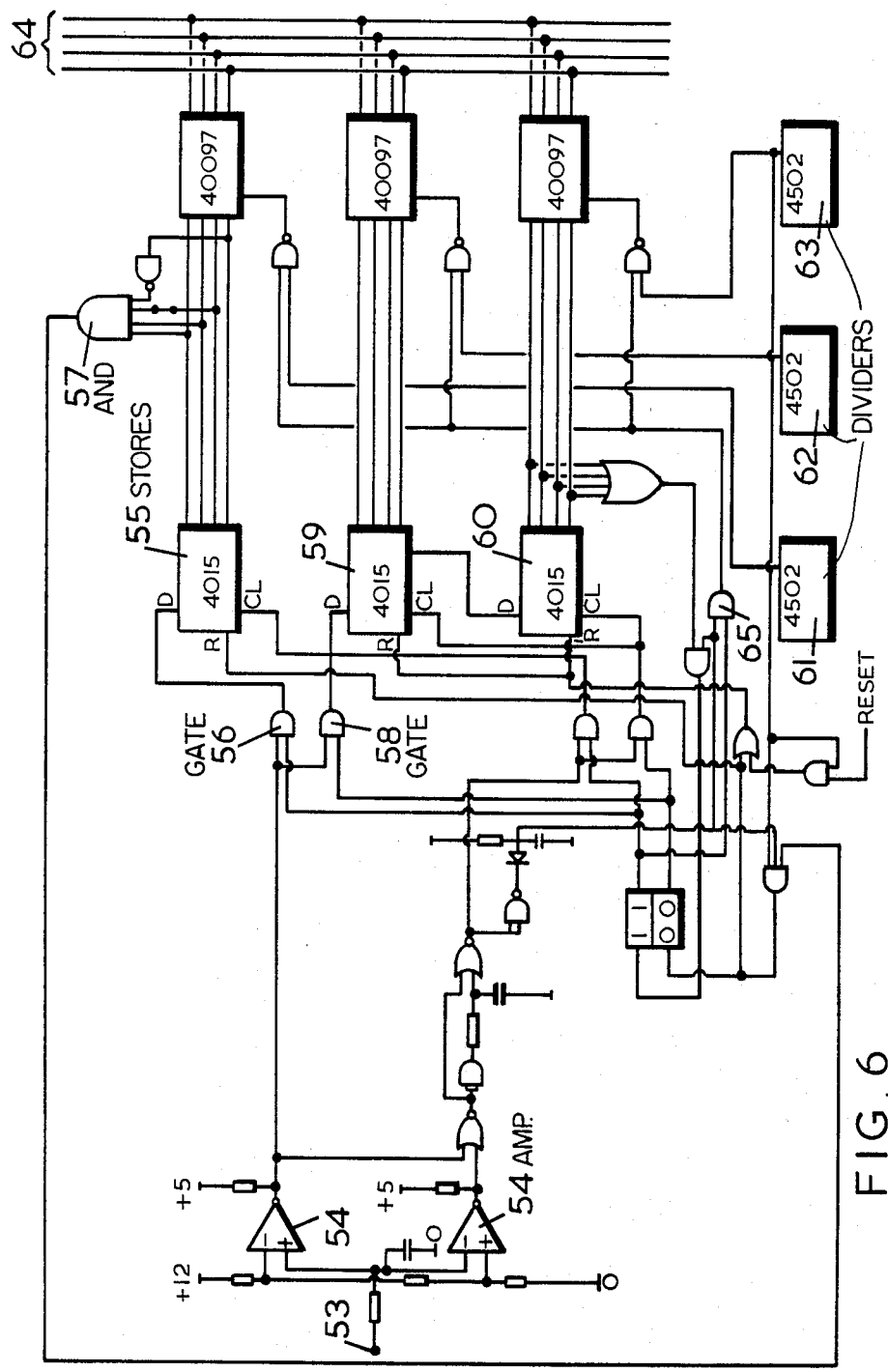
FIG. 6 schematically illustrates data signal stores located at the exchange.

Referring now to FIG. 6, a circuit suitable for use in the exchange data sorce 18 (FIG. 1) is schematically illustrated. The illustrated circuit represents the equipment required to process data signals from one subscriber station and therefore three sets of such equipment would be required for each subscriber unit having three subscriber stations.

Data signals are received from the combiner 23 (FIG, 2) at terminal 53 and the positive and negative pulses (relative to +6 volts) of the b.c.d signal are detected by the pair of differential amplifiers 54. The first four bits of a received data signal, i.e. the first b.c.d signal keyed in, is delivered to a first store 55 via gate 56. If the store b.c.d signal corresponds to the "star" button on the respective keypad, in this case 14 (1110), the output of an AND gate 57 goes to logic "1". As a result gate 56 is closed and gate 58 is opened. Two subsequent b.c.d signals can then be written into second and third stores 59 and 60. Thus by passing the star button and then two buttons to identify the desired channel the subscriber automatically enters data signals identifying the desired channel number in stores 59 and 60.

If the subscriber wishes to transmit to the exchange data signals which are not related to television signal selection, he first presses "crosshatch" and then the buttons corresponding to the data he wishes to transmit. Each b.c.d signal is stored in turn in the first store 55, the stores 59 and 60 being unaltered as the store 55 never contains the code corresponding to "star" which the gate 57 is arranged to detect.

The read out of b.c.d data from the stores 55, 59 and 60 is controlled by dividers 61, 62 and 63 driven by a common oscillator. Each divider is set to read out the content of its associated store at a different time such that the contents of the stores 55, 59 and 60 are read out sequentially onto a common bus bar 64. It will be appreciated that each subscriber unit has three sets of three associated dividers and that all the dividers of equipment connected to the common bus bar must read out at different times.

The signals appearing on the bus bar 64 are routed to the appropriate data stores and television selection devices, the output of store 59 controlling the group selector 16 of FIG. 1 and the output of store 60 controlling the single channel selector 17 of FIG. 1. As each signal on the bus bar is alloted to its own time slot as determined by the common oscillator the distribution of these signals to the appropriate destination whether within the local exchange or to the head end is a relatively simple matter.

If the three star and three crosshatch buttons of each subscriber unit are given respective identifying codes, e.g. 10 to 15, monitoring of these identifying codes would detect any faults which resulted in confusion between the signals emanating from particular subscriber units. A high degree of security between subscriber stations is thus obtained.

The contents of the stores 55, 59 and 60 are read out cyclically, readout during an update of any store being inhibited by gate 65. Thus it is not necessary for there to be any particular relationship between the keypad polling times and the readout times.

The AC component of the polling signal (FIG. 4A) may be for example square waves or sinusoidal and can itself by frequency modulated at the exchange to enable information in addition to television signals to be directed to individual subscriber stations. For example, the polling signal could be modulated with a binary code unique to a particular subscriber station followed by a message code, the subscriber station being responsive only to message codes preceded by its own unique code. This facility enables the system to be used to operate equipment in the subscribers premises, e.g. VCR's, meter reading devices, storage heaters or the like, or for example to confirm receipt of a keypad message ordering goods.

In the description of FIG. 1 above, reference is made to the illustrated system operating in accordance with the 525 line NTSC standards which apply in the United States of America. In the United Kingdom the 625 line CCIR standards apply, and if these standards were applied to the illustrated system the five television signals on each trunk cable would be allotted to the frequencies 54 HHz, 70.2 MHz, 91.8 MHz, 118.8 MHz, and 151.2 MHz. These frequencies are respectively 10, 13, 17, 22 and 28 times 5.4 MHz. Spurious products are all 5.4 MHz from the luminance carriers of the signals and because these are on the edge of the color signal, i.e. 1 MHz above the 4.43 MHz PAL color carrier and 0.6 MHz away from the 6 MHz sound carrier, these products do not interfere with the picture or sound transmission.

FIGS. 1 to 6 are concerned primarily with communication between subscriber stations and an exchange. It will however be apparent that communications between an exchange and the head end can be effected in a similar fashion by maintaining the relationship between the time at which a data signal is transmitted over the system and the source of that signal.

Such an arrangement is satisfactory in a small system, but in larger systems serving for example tens of thousands of subscriber stations the allocation to each subscriber station of a unique time slot would make the system response time unacceptably long.

Figure 7:
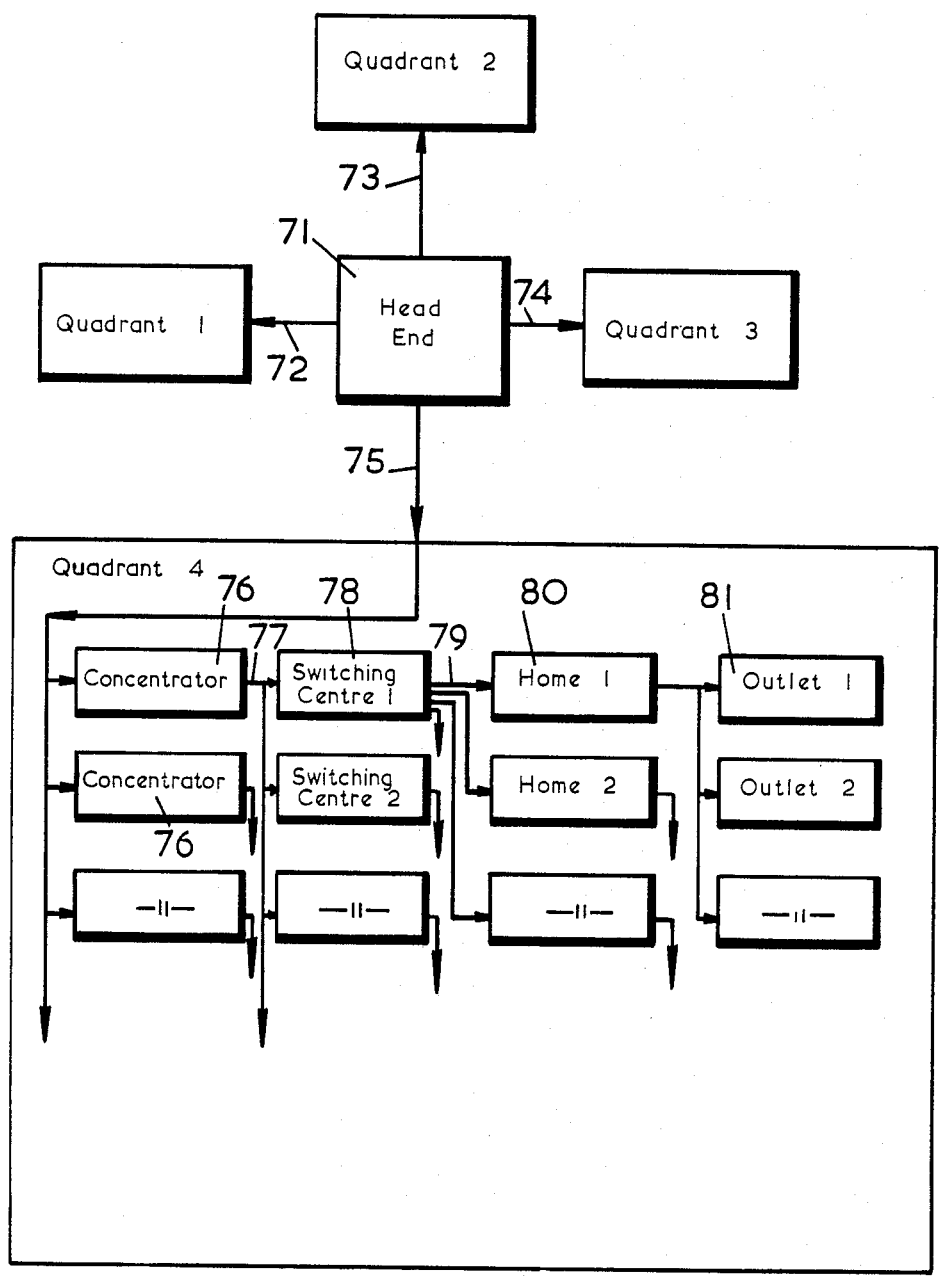
FIG. 7 is a schematic diagram of a large scale system according to the invention.

Referring to FIG. 7, the illustrated system is intended to serve a large number of subscribers and yet provides a very fast system response. The system illustrated in FIG. 7 comprises a single head end 71 which includes a central processing unit. The head end serves four geographical areas referred to as Quadrants 1 to 4 via trunk cables 72, 73, 74 and 75. The organizational arrangements of the equipment in all four Quadrants is the same.

As shown in Quadrant 4, the trunk cable 75 is connected to a series of concentrators 76 of which there are for example thirty two. Each concentrator 76 is connected by a sub-trunk cable 77 to a respective group of exchanges or switching centres 78. Typically there will be eight switching centers per concentrator. Each switching center is connected by a series of drop in cables 79 to a respective group of homes 80. Typically there will be forty eight homes per switching center. Each home may have up to three independently controllable subscriber stations 81 each comprising a television set and a keypad for transmitting data to the system.

The system thus has the capacity to serve $4 \times 32 \times 8 \times 48 \times 3$ stations, that is 147,456 stations.

Figure 8:
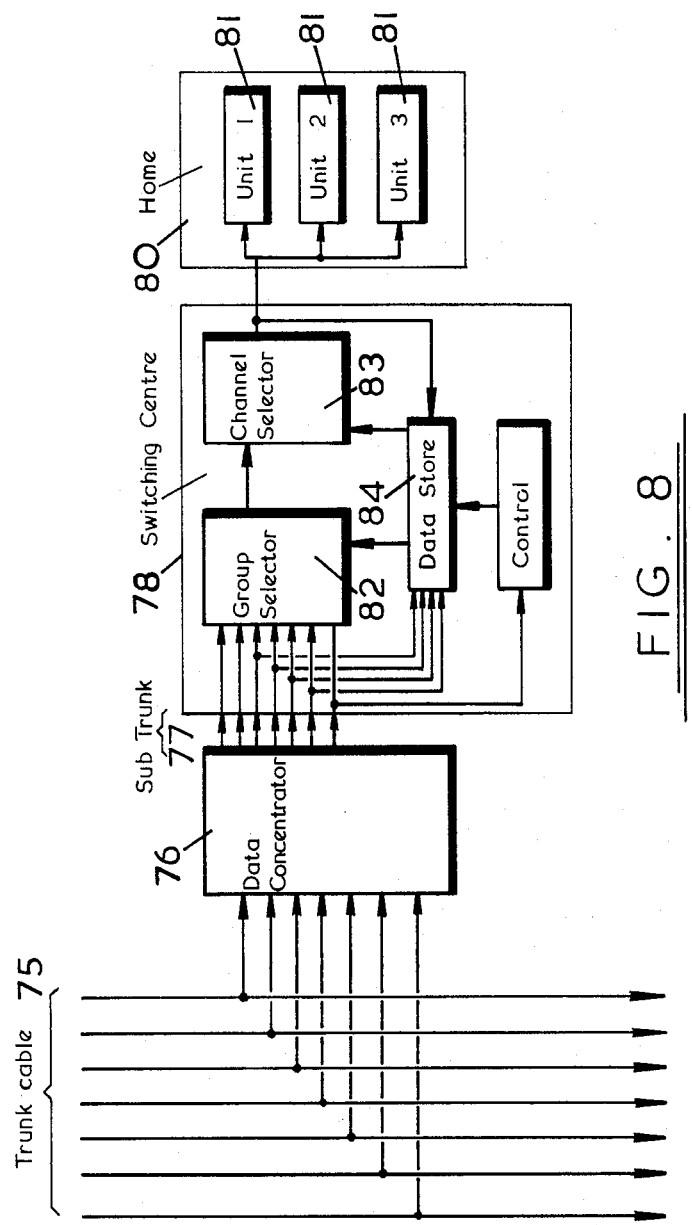
FIG. 8 is a schematic diagram of a data concentrator and a switching center serving one home in the system of FIG. 7.

Referring now to FIG. 8, the equipment associated with one concentrator is shown in greater detail. The trunk cable 75 comprises seven coaxial tubes all of which are shown connected to each one of a series of concentrators 76. Each one of six of the seven tubes carries a group of five VHF FDM television signals and the seventh tube carries a group of Band II radio signals. All the tubes may also carry data signals transmitted at a 1 Mbit per second rate and encoded to the Manchester II system.

One tube carries keypad data from a group of sixteen concentrators to the head end. A second tube carries data drom the head end to the group of sixteen concentrators. This system is duplicated to allow the connection of thirty two concentrators.

The fifth tube carries control data to all thirty two concentrators from the head end. The remaining two tubes carry synchronising signals.

The data rate of the trunk is 1 Mbit per second. Each of the 36,864 keypads in quadrant 4 is allocated a respective time frame in a scanning sequence such that the source or destination of keypad data transmitted to or received from the head end is always known from the position in time of the data relative to the scanning sequence.

Each concentrator 76 is connected to each of its associated switching centres by seven coaxial tubes, six of which carry the groups of VHF television signals and the seventh of which carries Band II signals and control data signals. Keypad data is transmitted on four of the six lines carrying VHF relevision signals. The data rate on the sub trunk data lines is 93.75 Kbit per second.

The switching center is similar to that described with reference to FIG. 1 and comprises two selectors 82 and 83 controlled by a data store 84. The selector 82 selects the group of television signals on one of the sub trunk lines and the selector 83 selects one of the television signals from the selected group for transmission to the respective subscriber station 81 in the home 80.

Figure 9:
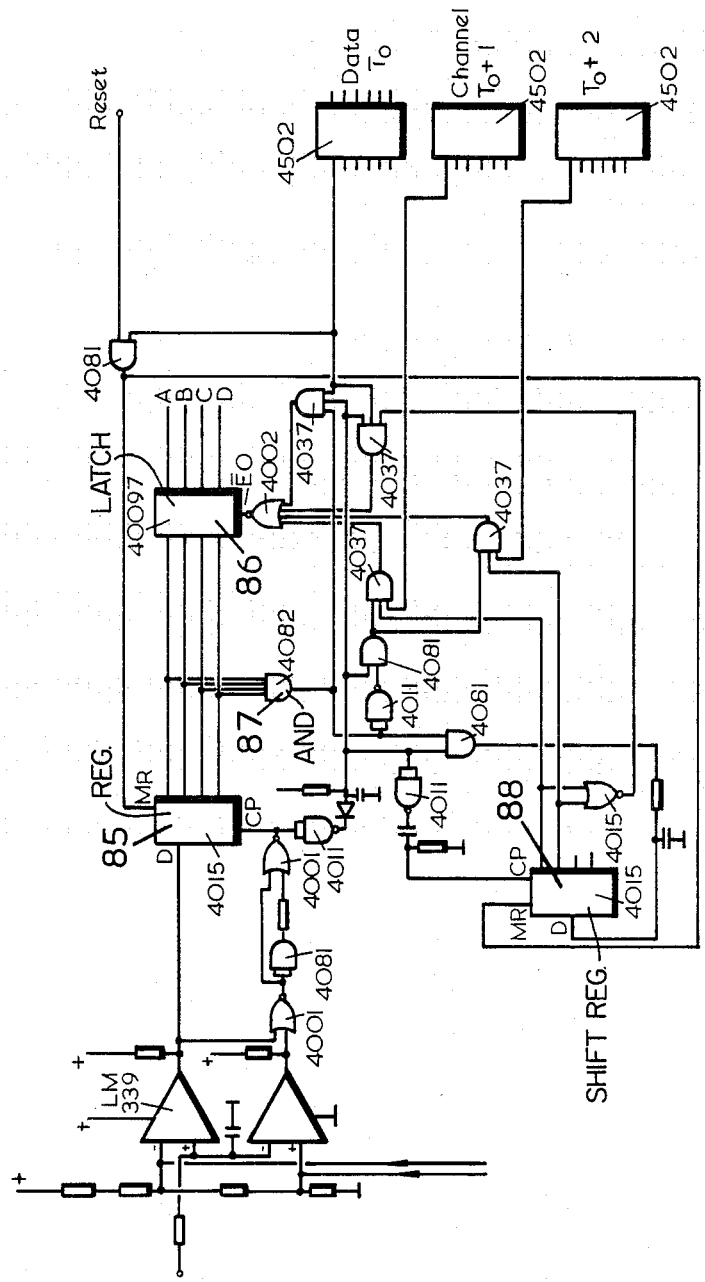
FIG. 9 is a detailed diagram of data storage equipment provided for one subscriber unit in the switching center.

Referring to FIG. 9, the illustrated equipment is that which stores data signals received from one subscriber station of one home and is similar to that illustrated in FIG. 6. Data signals related to television signal selection comprise a first four bit code indicative of a desire to select a television signal, a second four bit code identifying the group of signals, and a third four bit code to identify the particular signal of the selected group of signals. The data signals are read serially into register 85, the parallel output of which is applied to a latch 86. The output of the latch 86 is processed as described below.

If the first four bit code identifies a desire by the respective subscriber unit to make a television signal selection, this is recognised by an AND gate 87. In the illustrated example, the AND gate 87 recognises the code number 85. Codes 11 and 13 can be recognised by providing inverters in appropriate inputs to the AND gate 87. If the AND gate 87 recognises a first code indicative of a desire to select a television signal, a shift register 88 enables the latch 86 to transmit the subsequent two four bit codes.

The keypads of each subscriber station comprise twelve buttons which produce bcd coded signals from buttons marked 0–9 inclusive and hexadecimal codes for 11, 13 and 15 in the 'star' position and codes 10, 12 or 14 in the 'crosshatch' position. The odd 'star' codes are allocated to the user for signalling a programme change instruction from respective subscriber stations and the "crosshatch" codes for signalling that a data message follows the "crosshatch" instruction.

The two types of code are hard-wired at the keypad and are allocated in pairs to individual subscriber stations, i.e. 10 and 11, 12 and 13, and 14 and 15, at each one of three types of keypad. Homes with more than one station will be allocated keypad codes for each station which differ from one another.

All keypads are scanned by the switching center every 80 mS in three groups of 16 homes (48 subscriber stations) per switching center.

Each switching center is provided with 144 keypad 4-bit latches 86 which retain the number sent from the keypad until this is altered by subsequent operations. Hard-wired equipment at the switching center scans each group of 48 latches producing a 4-line (abcd) bus signal in which each subscriber station's address is identified by the timing of that particular subscriber stations slot of the sequential scan signal.

The concentrator is connected to eight switching centers by the five lines of the sub trunk. One line transmits a read/write instruction to each switching center in turn. The remaining four lines convey data to or from each line of the 4-line abcd bus at each switching centre.

Figure 10:
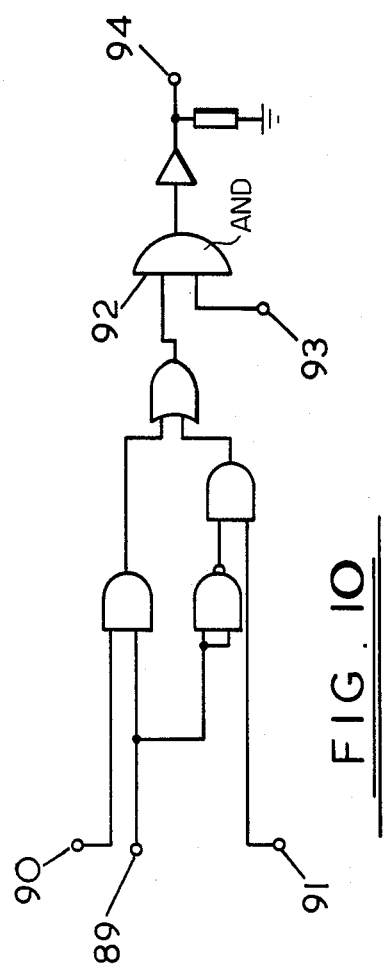
FIGS. 10 and 11 respectively illustrate a transmitter and a receiver for communicating data between the data concentrator and switching centers.
Figure 11:
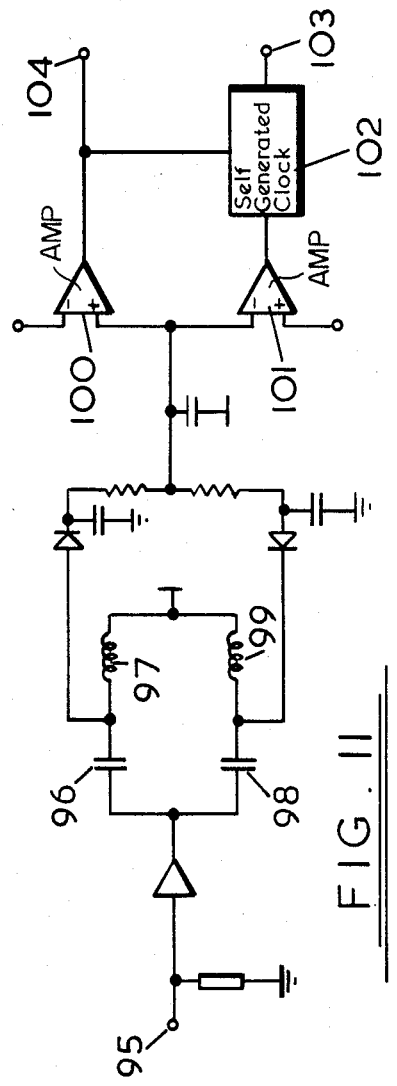

FIGS. 10 and 11 respectively illustrate the transmitter and receiver units which effect communication between the concentrator and each switching center. Five such transmitters and receivers are provided for each switch center and concentrator. In the transmitter, the data or read/write signal is applied to input 89 which switches either a 5.4 MHz clock signal at input 90 or a 4.2 MHz clock signal at input 91 to an AND gate 92. Input 93 to AND gate 92 receives a 94 Kbit per second input such that the transmitter output 94 delivers an HF FSK signal. In the receiver, the signal received from the transmitter of FIG. 10 is applied to input 95, filtered by parallel filter networks formed by capacitor 96 and inductor 97 and by capacitor 98 and inductor 99, applied to differential amplifiers 100, 101. This signal is used to control a self generated clock 102 providing a clock signal at output 103 and the data or read/write signal appears at output 104.

The main operational requirement of the concentrator is that it should poll a section of each local switching center in turn and transmit or receive from the head-end abcd 4-line bus data at a rate which permits all concentrators to be polled in turn and within a specified time interval (500 ms) allocated to the keypad user for interrogation and reply.

The polling sequence specified for local switching centers is chosen to reduce the data storage requirements at concentrators and the required sequence is such that each group of 16 homes of the 48 homes served by one switching center is to be polled in turn. This sequence is synchronized to the timing of keypad polling/enabling signals sent from each center. Keypads are split into 3 groups for timing purposes, the second group is polled 26.6 mS after the first and the third group 26.6 mS after the second, the cycle repeating every 80 mS.

The concentrator therefore addresses 16 homes sequentially at each of 8 switching center in turn collecting data, and repeats the cycle to deliver data to the same 16 homes sequentially at each switching center in turn before moving on to scan the next group of 16 homes 26.6 mS later at each switching center.

The concentrator also performs a simple data processing operation. This requires E2 PROM (electrically erasable) storage at the concentrator to provide local means of controlling viewer access to premium channels or programs. This distributed data processing reduces the work load of the CPU at the head-end and reduces (by reducing the amount of data to be transmitted from concentrators to the head-end) the signalling rates on the main trunk.

The scan cycle of the system is maintained from local switching center to the head-end CPU such that subscriber addresses are given by a unique time slot allocation in the TDM signal format.

At each local switching center each subscriber station is assigned three time intervals (T0, T0+1 and T0+2). The T0 time interval is allocated to keypad data, which includes 'programs change' codes generated at keypads (11, 13 or 15) whenever a subscriber unit signals a desire to change the programs currently transmitted. Time intervals T0+1 and T0+2 are automatically assigned at local switching centers when the appropriate program change code is generated. These T0 +1 and T0+2 intervals define, after two further operations of the keypad, the program chosen by the subscriber unit. Signals at all three time intervals (T0, T0+1 and T0+2) are sent to the concentrator and the T0+1 and T0+2 interval signal (each of 4 bits) are compared to channel denial numbers sent from the CPU at the head-end and held in the E2 PROM. When a channel selected by a subscriber station is a denied channel, i.e. is non-authorized, the concentrator sends to the appropriate switching center, and at a time in the scan cycle assigned to that particular subscriber station, a reset signal which returns the program selection switch at the switching center to a reference channel.

The concentrator also modifies the T0+1 and T0+2 signals received from switching centres before transmitting these to the head-end. This permits a reduction in the time allocated for the data to be sent from a concentrator to the head-end CPU. This reduction is thus one third of the maximum rate received from switching centers. The T0+1 and T0+2 signals which only appear at switching centres during changes in the selected program signal are reallocated in time to occupy sequential T0 intervals at the concentrator before the concentrator reassembles data for high speed transmission mission to the CPU located at the head-end.

This does not conflict with the basic transparency requirement of the system which is that every 4-bit message received from a keypad is made available at the head-end CPU. Every keypad is scanned at regular intervals (80 mS) and is controlled by timing signals also controlling interface equipment generating the 4-line (abcd) data.

All the waveforms at switching centers and between switching centers and concentrators are synchronized to a harmonic of a master reference (31.25 kHz) signal generated at the head-end and made available on the main trunk and sub trunk. This ensures that a subscriber's address is accurately defined in TDM, and it also ensures that data transmitted from the head-end CPU or from the concentrator to local switching centers can be uniquely addressed to the appropiate store at the switching control board or to the appropiate subscriber station via the 4-line (abcd) serializer.

A universal asynchronous receiver/transmitter (UART) is provided for conversion of microcomputer parallel to serial data and to convert the non-return to zero (NRZ) coded output from the UART to Manchester coding before transmission via the main trunk line. Reverse signal processing capabilities are also provided for reception of head-end data.

An interface is provided between tubes of the multi-tube coaxial main trunk amd MED equipment for transmitting and receiving data betwen the head-end CPU and concentrators. The MED equipment directs data into or out of a particular concentrator or, at some locations and during the inoperative scan period of that concentrator, acts as a regenerative repeater for data travelling either to or from other concentrators. Transmissions on the trunk are at speeds of 1Mbit per second.

Television signal denial information sent from the head-end CPU is held for all subscriber units. The storage requirement is reduced by arranging that all television signal channels are denied to subscriber stations at the concentrator subject to denial override information sent from the head-end to release channels to subscribers. Up to 16 classes or tiers of channels may be released to each subscriber unit. RAM storage is provided in the concentrator for recording the television channels denied at 1152 outlets. The RAM storage required is 11.52K×8 bits. Six static RAMs each of 2K×8 bits are provided of volatile memory. The concentrators scan one-third of all stations at each of eight exchanges sequentially. Storage is provided for each group of 48 stations in order that the concentrator can assemble information (4 bit) for transmission to the head-end. A similar storage operation is required for data sent from the head-end to the group of 48 outlets. The volatile RAM store has spare capacity for both functions.

The thirty two concentrators send or receive data from the head-end CPU every 80 ms (within the keypad scan interval). Although each concentrator serves 1,152 outlets, i.e. eight switching centres, keypad storage is required only for that group of forty eight subscriber stations currently being served in one transmission interval. Additional storage is, however, provided for other purposes.

To allow for system modifications and expansion of services, an electrically erasable programmable read only memory (E2 PROM) is provided.Instructions held in the E2 PROM at each concentrator may be modified, when necessary, by signals sent from the head-end CPU.

31.25 kHz reference signals are transmitted from the head-end. Synchronizing and timing waveforms for controlling input/output data timing from the head-end CPU and from all eight switching centers served from one concentrator are also provided.

The four-line (abcd) bus at each switching center carries a sequential signal of 93.75 kbit/sec on each line. The three time intervals, TO, TO+1 and TO+2, each of 10.6 µS duration, are allocated to each outlet but during any one keypad scan interval only one of these time slots carries keypad signals to the concentrator. Thus the effective data rate is 31.25 kbit/sec per line. The scan time for each group of forty eight subscriber stations is therefore $48 \times 3 \times 10.6 \mu S = 1.536$ mSec.

The maximum time available for each one of the thirty two concentrators to send data to the head-end CPU is half the keypad scan interval (this allows for return transmission) and is (40 mS/32)=1.25 mS.

Allowing 98 μS for differential cable delay time and signal encoding/decoding delays, the scan period (message time) is 1.152 mS and the transmission rate for 1,152 subscriber stations, i.e. eight switching centers each of 144 subscriber stations, is 1 Mbit/sec.

The four-bit store for 1,152 subscribers stations (in practice a 2K store) must be addressed to release or accept four-bit nibbles to and from a USART parallel to serial converter at a 250 kbit/sec rate, i.e. within 4 μS, to meet the required 1 Mbit/sec serial transmission rate.

The concentrator comprises a processor to time sequentially assembled keypad four-bit data received from the four-line (abcd) bus of each 48 subscriber station module (3 per switching center) and from eight switching centers, for transmission to the head-end CPU every 80 mS. Data is transmitted form the head-end CPU to each 48 subscriber unit group at each switching center every 80 mS. A reset signal, (the program change code 11, 13 or 15) is generated whenever the subscriber selects a denied channel and within 80 mS of dialling for a denied channel. A channel selection change (from the reference or reset channel) is inhibited until the subscriber has dialled the signal group and particular frequency of his permitted channel.

The RAM storage provided in the concentrator may be less than that referred to above. In a 30 channel system, only threee data bits are needed to define the selected cable and only a further three data bits are needed to define the programselected from each cable. As three data bits can define up to eight selections, such an arrangement can define up to sixty four channels provided as eight channels on each of eight cables.

As a further variation, a comparison may be made at the concentrator between a program selection made by a subscriber and the selections which that subscriber is permitted to make. This comparison may be made using for example a combination of hardware and a fast microprocessor such as the National Semiconductor NSC 800 operating to make a series of successive approximations similar to a Hamming Code. This results in an increase in the speed with which the program denial facility operates.

The general structure of the previously described systems is such that comprehensive teletext services can be incorporated. It is well known that in conventional teletext systems teletext signals are transmitted during unused lines of a standard broadcast. Selected teletext signals are stored in the receiver, and the stored teletext signals are decoded and displayed when the receiver is switched to the teletext mode.

As the teletext signals occupy only a small fraction of the television signal field only alimited number of "pages" of teletext can be transmitted per second. For example the British Broadcasting Corporation provides a teletext service in which page 169 has 20 to 30 sub-pages which are displayed sequentially at 25 second intervals.

If a television channel is allocated to teletext, i.e. teletext signals are broadcast on almost every line of the television field, with the text inserted on only two fields, of the order of 2.5 million differently addressed sub-pages can be provided on a single channel. It is possible to establish secure and confidential two-way communications between an individual subscriber station and a central service agency such as a bank by utilizing this large teletext capacity in combination with the communications system as described above.

Essentially one allocates to each subscriber (of which there may be more than one authorised to use one subscriber station) a unique 7-digit teletext sub-page number. Information pertaining to that subscriber will then always be transmitted as the sub-page of teletext identified by that 7-digit number. Another subscriber could select the same sub-page for a period and if that page was active during that period could decode and display the broadcast information. the broadcast information need not however identify the subscriber to whom it was directed and this taken out of context could be meaningless. On the other hand, the transmission of information on a subscriber dedicated sub-page can only be initiated by signals arriving at the head end in the period allocated to the particular subscriber station. In addition, certain services can be denied to a particular subscriber station unitl a subscriber identifying personal identification number (P.I.N. number)is keyed into the system at that station. The system is thus very secure and confidential.

Figure 12:
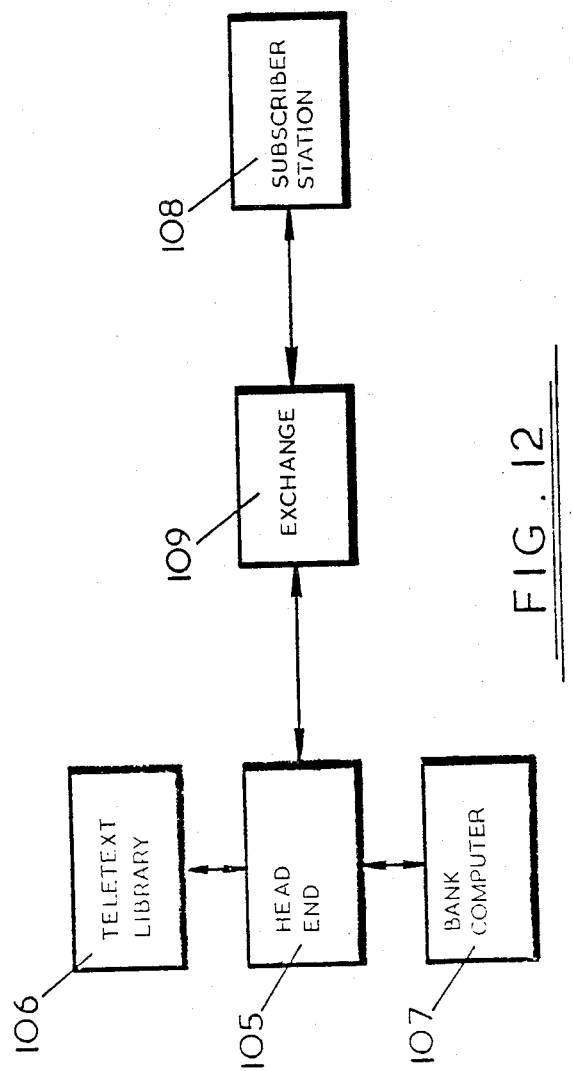
FIG. 12 schematically illustrates a system of the type described above incorporating further teletext features.

FIG. 12 illustrates for example a system of the type shown in FIG. 1 with additional teletext features. Details of the system already described above have been omitted. The head end 105 has associated with it a teletext page library 106 from which signals representing individual sub-pages of teletext can be derived under the control of a head end central computer (not shown). The head end is also connected to a bank computer 107 with which a subscriber station is to transact business.

The subscriber station 108 has a teletext receiver connected to the head end via an exchange 109 as in FIG. 1. The system has two of its channels dedicated to teletext and banking services respectively. If the subscriber selects the teletext channel, his receiver is automatically switched to the teletext mode. All the teletext signals on the teletext channel are made available at his receiver and he can select that which is of interest to him. On the other hand, if he selects the banking channel he is then in a position to communicate with and effect transactions with his bank.

In detail, if a subscriber wishes to use the banking channel, he first presses the "star" button on his keypad. The system responds by displaying a list of the available channels on his receiver. The keypad also sends a 'Reset' command to the receiver which responds by reverting to the picture mode and resetting the teletext decoder to the default page. Next the subscriber keys the two digits corresponding to the banking channel. The keypad recognizes this as a "teleresponding" program request, and sends a 'TEXT' command to the receiver as well.

All teleresponse messages are transmitted using the teletext 'newsflash' mode. This means that the receiver continues to display pictures into which any messages are 'boxed', i.e. displayed on a rectangular monochrome area. The teleresponse programs carry repetitively on the default page the boxed message 'Enter your page number' and this is therefore displayed by the receiver almost immediately.

The fact that a particular subscriber has selected the banking channel is passed by the upstream data channel to the head end computer via the data concentrator. The head end computer passes the subscriber details via a link to the bank computer which in turn instructs the teletext encoder appropriate to the channel to send the next two instructions on that subscriber's page and sub-page respectively.

When the subscriber keys in his personally assigned page number the keypad passes the command to the teletext receiver which then displays the instruction "please press code". Pressing the keypad button marked 'Code' causes the receiver to modify the display by adding the words "now enter your P.I.N. and press reveal".

The 'P.I.N.' or Personal Identification Number is the four-digit sequence used as the sub-page code. Keying this into the handset causes the receiver to select the transmitted sub-page and give the instruction "now key crosshatch, O, stop".

The crosshatch prefix tells the keypad now to transmit to the subscriber station only, and the 'O' response passed via the system to the bank computer tells the latter that the subscriber has successfully completed the 'logging-on' procedure and that his receiver is ready to receive any messages transmitted on his personal sub-page. The 'menu' normally follows; that is a list of available services such as "latest credits", "credit transfer" etc., each associated with a corresponding number. If the subscriber wishes to effect a credit transfer, he keys in the appropriate number and the bank computer proceeds to ask for details as to accounts, amounts etc. relevant to the desired transaction. The computer finally displays a resume of the desired transaction and asks the subscriber to key in a particular code if he accepts that the resume is accurate. The transaction is thus completed, to be followed up by hard copy confirmation from the bank in due course.

It will be observed that this method of teleresponse has a very high degree of security. As has been previously shown, the probability of unauthorised interception is very low. It is further reduced in practice by inserting messages other than logging-on instructions in two fields only, and by terminating every transaction session with an 'erase page' message. The upstream security is even higher, because the seven-digit sub-page numbers are known only to the subscriber and to the bank computer and are never transmitted via the network. Because the upstream data is time-division multiplexed it is very difficult for a would-be malefactor to insert a fraudulent message into the correct time slot, other than from the premises of the purported subscriber or from an illegal connection to his drop-in cable.

The above description of teletext services assumes a knowledge of conventional teletext systems. Such knowledge can be obtained by refernce to the following publications, the contents of which are incorporated herein by reference:

Electronics, Vol. 26, No. 3, August 1980, pages 527 to 554 "Enhanced U.K. Teletext-Moves towards still pictures" by J. P. Chambers, IEEE Transactions on Consumer.

Proc. IEE, Special Issue on Teletext and Viewdata, Electronics Record, Dec. 1979, pages 1417-1424 "Teletext and Viewdate Systems and their possible extension to the U.S.A.", by G. D. Crowther and D. S. Hobbs.

A wide variety of other services could be provided in a similar way to the banking services described above. For example, a shopping channel could be dedicated to continuously broadcasting advertisements for goods. A subscriber would be able to order displayed goods by the same processes as he can effect banking transactions.

As an alternative to the above-described teletext system for establishing interactive communications, signals from the head end to subscribers registering acknowledgement of subscriber responses to broadcast television signals on one channel can be transmitted via a second teletext channel. The physical layout of the system would be generally the same as in FIG.12, but the central computer would control the subscriber stations signal selectors at the exchange to briefly connect the subscriber station to the teletext channel so that the appropriate information could be acquired by the teletext receiver. The receiver would automatically select the sub-page of teletext dedicated to its own subscriber station. The subscriber would continue to view the initially selected channel but the information acquired from the dedicated sub-page of the teletext channel would be inlaid on the analog picture display. With this arrangement, teletext signals would only be transmitted on the single teletext channel but teletext inormation can be inlaid on subscribers screens regardless of the channel they have selected providing the subscribers receivers are operating in the teletext mode.

What is claimed is:

1. A communications system comprising at least one exchange, a plurality of television signal sources making signals available at the exchange, a plurality of subscriber's units each connected to the exchange by a respective direct communications link and each provided with a television signal receiver, and selectors located at the exchange for selectively connecting the television signal sources to the communications links, the subscriber's units having transmitters for applying data signals to the respective communications links for transmission to the exchange to control the selectors, wherein each subscriber's unit is associated with a respective exchange located selector controlled by that subscriber's unit's transmitter, the selector associated with at least one subscriber's unit applying television signals to the respective communications link at a frequency to which the subscriber's unit's receiver is tuned, and the subscriber's unit transmitter being responsive to a timing signal transmitted on the communications link from the exchange to apply data signals to the respective communications link, the exchange comprising means responsive to said timing signal to identify the source of data signals received from the subscriber's units wherein at least one of the subscriber's units comprises two subscriber's stations each of which has a respective television receiver and data signal transmitter, and each subscriber's station is associated with a respective exchange located selector controlled by that subscriber's station's transmitter, the selectors associated with the subscriber's stations of said at least one subscriber's unit applying frequency division multiplexed television signals to the respective communications link, each subscriber's station receiver being tuned to receive a respective one of the television signals applied to the communications link, and the subscriber's station's transmitters being responsive at different times to the timing signal to apply time division multiplexed data signals to the communications link, whereby the means at the exchange responsive to the timing signal can identify the source of data signals received on the communications link.

2. A communications system according to claim 1, wherein the exchange comprises a timing signal transmitter providing an AC timing signal periodically clamped to each of a plurality of DC voltages in a predetermined sequence, each subscriber's station of said at least one subscriber's unit comprises means for detecting a respective one of the plurality of DC voltages, and means for transmitting data signals to the exchange at a predetermined time related to the timing of the detected DC voltage, and the exchange comprises means for correlating received data signals and the timing signal to identify the source of the received data signals.

3. A communications system according to claim 2, wherein each subscriber's station comprises means for deriving power for its data signal transmitter from the AC component of the timing signal.

4. A communications system according to claim 2, wherein said at least one subscriber's unit comprises three subscriber's stations and the timing signal is periodically clamped to each of three DC voltages in turn.

5. A communications system according to claim 4, wherein the AC component of the timing signal is biased to a first DC voltage, the three DC clamping voltages being this first voltage and the positive and negative peaks of the AC component relative to this first voltage.

6. A communications system according to claim 2, wherein the data signal transmitter of each subscriber's station when transmitting superimposes on the timing signal data signals in the form of binary coded DC voltages.

7. A communications system according to claim 2, wherein the exchange comprises a filter for detecting data signals received from the said at least one subscriber's unit, a switching network for selectively applying detected data signals to respective ones of its outputs, and means for controlling the switching network in response to the timing signal such that data signals from any one subscriber's station are applied to a respective one of the switching network outputs.

8. A communications system according to claim 1, wherein the exchange comprises a store for each subscriber's station into which received data signals are written and means for periodically reading out the content of the stores.

9. A communications system according to claim 8, wherein each store comprises two sections, the first section storing data signals not released to selector control and the second section storing selector control data signals, and each subscriber's station data signal transmitter comprises means for indicating whether or not transmitted data signals constitute selector control data signals.

10. A communications system according to claim 9, wherein each subscriber's station data transmitter comprises a keypad having twelve keys, ten of the keys indicating decimal numbers and the other two keys indicating selector control and not selector control data signals respectively, the exchange store being responsive only to data signals including as a first element the data signal resulting from actuation of one of said two keys.

11. A communications system according to claim 10, wherein none of the data signals resulting from actuation of any of said two keys of the subscriber's stations of said at least one subscriber's unit are the same and the store is adapted to reject selector control data signals not preceded by the appropriate first element.

12. A communications system according to claim 9, wherein the second section of the store comprises two subsections for receiving first and second elements of a selector control data signal, and each subscriber's station's selector comprises a first stage arranged to select any one of a plurality of groups of television signals and a second stage arranged to select any one of the selected group of television signals, the first and second selector stages being responsive to respective ones of the two store subsections.

13. A communications system according to claim 1, comprising a plurality of exchanges each connected to a head end installation by a trunk communications network, wherein each exchange comprises a store in respect of each subscriber's station in which data transmitted to the exchange from that subscriber's station is stored, and means are provided for sequentially addressing the stores to read out the stored data onto the communications link in a time division multiplexed data stream, the source of the read out data being identified by its position in the data stream.

14. A communications system according to claim 13, wherein the exchanges are connected in groups to a plurality of data concentrators that are in turn connected to the head end installation, each data concentrator comprising means for storing data received from the head end to indicate which television channels are to be accessible to individual subscriber's stations, means for storing data received from the exchanges indicative of television channels selected by individual subscriber's stations, means for comparing the stored data, and means for transmitting signals to the exchanges to control the subscriber's station's selectors to prevent access to television channels to which access is to be prevented.

15. A communications system according to claim 14, wherein the data concentrator comprises means for assembling data received from the exchanges, and means for releasing the assembled data to the head end installations in time slots specific to the source of the received data.

16. A communications system comprising at least one exchange, a plurality of television signal sources making signals available at the exchange, a plurality of subscriber's units each connected to the exchange by a respective direct communications link and each provided with a television signal receiver, and selectors located at the exchange for selectively connecting the television signal sources to the communications links, the subscriber's units having transmitters for applying data signals to the respective communications links for transmission to the exchange to control the selectors, wherein each subscriber's unit is associated with a respective exchange located selector controlled by that subscriber's units transmitter, the selector associated with at least one subscriber's unit applying television signals to the respective communications link at a frequency to which the subscriber's unit's receiver is tuned, and the subscriber's unit transmitter being responsive to a timing signal transmitted on the communications link from the exchange to apply data signals to the respective communications link, the exchange comprising means responsive to said timing signal to identify the source of data signals received from the subscriber's units, wherein at least one subscriber unit is provided with a teletext receiver, means are provided for supplying teletext signals on one television channel of the system, said at least one subscriber's unit is allocated exclusive use of one teletext sub-page, the content of the said sub-page being responsive only to data signals supplied by the said at least one subscriber's unit and one television channel is dedicated to full field teletext signals, and a second channel is dedicated to provide interactive services, selection of the second channel by the said at least one subscriber's unit automatically switching the associated receiver to its teletext mode, and selection of the said one sub-page of teletext giving access to the said interactive services.

17. A communications system according to claim 16, wherein use of the interactive services is denied unless the subscriber transmits a predetermined PIN number over the system.

18. A communications system according to claim 16, wherein a first television channel is dedicated to full field teletext signals, and a second channel is dedicated to provide interactive services, means being provided such that if the said at least one subscriber's unit transmits data over the system in response to information on the second channel a system response is transmitted on the sub-page of teletext dedicated to that subscriber's unit, the subscriber's unit's selector at the exchange being automatically controlled to momentarily connect the teletext receiver to the said first channel such that the data transmitted on the dedicated sub-page is acquired and inlaid on the picture received from the said second channel.

19. A communications system comprising a plurality of subscriber's units each connected to a communications network capable of delivering any one of a plurality of different signals on respective television channels, wherein at least one subscriber's unit is provided with a teletext receiver, means are provided for supplying teletext signals on one television channel of the system, and said at least one subscriber's unit is allocated exclusive use of one teletext sub-page, the content of the said one sub-page being responsive only to data signals supplied by the said at least one subscriber's unit, wherein a first television channel is dedicated to full field teletext signals, and a second channel is dedicated to provide interactive services, means being provided such that if the said at least one subscriber's unit transmits data over the system in response to information on the second channel a system response is transmitted on the sub-page of teletext dedicated to that subscriber's unit, the subscriber's unit's selector at the exchange being automatically controlled to momentarily connect the teletext receiver to the said first channel such that the data transmitted on the dedicated sub-page is acquired and inlaid on the picture received from the said second channel.

* * * * *